(12) United States Patent
Thompson

(10) Patent No.: US 7,367,193 B1
(45) Date of Patent: May 6, 2008

(54) AUXILIARY POWER UNIT CONTROL METHOD AND SYSTEM

(75) Inventor: Robert G. Thompson, San Diego, CA (US)

(73) Assignee: Hamilton Sundstrand Corporation, Rockford, IL (US)

(*) Notice: Subject to any disclaimer, the term of this patent is extended or adjusted under 35 U.S.C. 154(b) by 998 days.

(21) Appl. No.: 10/625,288

(22) Filed: Jul. 23, 2003

(51) Int. Cl.
*F02C 9/28* (2006.01)

(52) U.S. Cl. .............. 60/773; 60/39; 60/281

(58) Field of Classification Search .......... 60/39.27, 60/39.281, 773, 790
See application file for complete search history.

(56) References Cited

U.S. PATENT DOCUMENTS

| | | | |
|---|---|---|---|
| 3,665,495 A | 5/1972 | Carter et al. | |
| 3,886,731 A * | 6/1975 | Greune et al. | 60/39.281 |
| 3,902,315 A * | 9/1975 | Martin | 60/39.281 |
| 4,106,085 A | 8/1978 | Demarest et al. | |
| 4,707,142 A | 11/1987 | Baker et al. | |
| 4,728,806 A | 3/1988 | Baker et al. | |
| 4,766,327 A | 8/1988 | Fox | |
| 4,849,923 A | 7/1989 | Samudrala et al. | |
| 4,874,961 A | 10/1989 | Henderson | |
| 4,937,462 A | 6/1990 | Recker et al. | |
| 5,142,163 A | 8/1992 | Hase | |
| 5,276,661 A | 1/1994 | Beg | |
| 5,315,533 A | 5/1994 | Stich et al. | |
| 5,317,500 A | 5/1994 | Iden et al. | |
| 5,553,449 A | 9/1996 | Rodgers et al. | |
| 5,555,151 A | 9/1996 | Baker et al. | |
| 5,606,244 A | 2/1997 | Migdal | |
| 5,729,059 A | 3/1998 | Kilroy et al. | |
| 5,784,240 A | 7/1998 | Przywozny | |
| 5,801,937 A | 9/1998 | Gold et al. | |
| 5,844,329 A | 12/1998 | Bailey et al. | |
| 5,864,457 A | 1/1999 | Kates et al. | |
| 5,990,575 A | 11/1999 | Flaugher | |
| 6,278,262 B1 | 8/2001 | Ullyott | |
| 6,291,911 B1 | 9/2001 | Dunk et al. | |
| 6,465,912 B1 | 10/2002 | Nakamura et al. | |
| 6,476,571 B1 | 11/2002 | Sasaki | |
| 2002/0022542 A1 | 2/2002 | Plleger et al. | |
| 2002/0074862 A1 | 6/2002 | Turvey | |
| 2002/0126518 A1 | 9/2002 | Lazarovich | |
| 2002/0138158 A1 | 9/2002 | Landreth | |

FOREIGN PATENT DOCUMENTS

EP    0 275 645 A2    7/1988

* cited by examiner

*Primary Examiner*—L. J. Casaregola
(74) *Attorney, Agent, or Firm*—Carlson, Gaskey & Olds

(57) ABSTRACT

An adjustment method and system for an auxiliary power unit (APU) allows the APU speed to vary based on the inlet air temperature to the APU compressor. The APU is controlled by a control law that allows the APU speed to float within a selected range based on speed and electric power generators phase matching criteria that provides smooth power transfer between the APU and a main engine generator. The specific APU mechanical speed for a given temperature may be determined from a compressor map that identifies the optimum combination of pressure ratio, flow rate and efficiency for a given inlet temperature, and avoids running the APU near mechanical resonant vibration conditions.

13 Claims, 4 Drawing Sheets

AUXILIARY POWER UNIT CONTROL METHOD AND SYSTEM

TECHNICAL FIELD

The present invention relates to aircraft engine controls, and more particularly to a control for an auxiliary power unit that augments the power of a main aircraft engine.

BACKGROUND OF THE INVENTION

Auxiliary power units (APUs) are gas turbine engines often used in aircraft systems to provide pneumatic and shaft power in addition to a main propulsion engine. As is known in the art, a compressor in the APU pumps air into a combustor at a given engine cycle maximum pressure (i.e., some multiple of ambient pressure) so that the combustor burns fuel in a high pressure environment. The burning fuel in the combustor heats the air prior to passing through the turbine. Because the products of combustion expanded through the turbine, above idle fuel flow rate develops more power than needed to drive the cycle compressor, some air (referred to as "bleed air") can be drawn off and used as a pneumatic output for other aircraft devices. Excess shaft rotational speed on cold days causes the compressor efficiency to decrease because the cold air flow being pulled through the compressor makes the inlet air flow relative to the tips of the inlet blades in the compressor very fast, reaching velocities significantly higher than the speed of sound; that is, the compressor impeller blades see supersonic Mach numbers, driving the APU efficiency down.

Alternatively, the power can be used to drive a load compressor that compresses air in a separate stage, which is also driven by the powerhead components (i.e., compressor, combustor, and turbine stages).

Normally, the APU compressor and turbine are run at a constant mechanical shaft speed. Although a constant APU shaft speed keeps speed control simple, the ambient air inlet temperatures encountered by the APU can vary over a wide range during normal operation. At very low ambient temperatures, the APU compressor and turbine often experience lower efficiencies and narrower compressor flow ranges and consequent compressor/turbine matching problems. Extremely low temperatures also may cause excessive bleed air pressure. Although heavier and/or more complex, pneumatic systems may be designed to accommodate the additional pressure, this type of modification is cumbersome and expensive. Further, very high ambient temperatures adversely affect APU power and efficiency by diminishing air flow rate, bleed air pressure, and the engine cycle pressure ratio.

Running the APU shaft faster on hot days and slower on cold days can improve the compressor and turbine efficiencies, but these adjustments may also cause mechanical vibration and resonance in the APU, increasing the likelihood of failures in the blade, disc and shaft.

There is a desire for a method and system that can optimize APU operation in extreme ambient temperature conditions without causing vibration and resonance in the APU.

SUMMARY OF THE INVENTION

The present invention is directed to an adjustable APU system and method that allows the APU shaft speed to vary based on the inlet air temperature to the APU compressor. In one embodiment, the APU is controlled by a control law that allows the APU shaft speed to float within a selected range based on speed and electric generator phase matching criteria that provides smooth "no break" power transfer between the APU and a main engine generator. When free of the electric power phase matching and switching requirement, the specific APU shaft speed for a given temperature may be determined from a compressor map that identifies the optimum combination of pressure ratio, flow rate and efficiency for a given inlet temperature.

By adjusting the APU shaft speed based on the ambient temperature, the invention optimizes APU operation even in extreme temperature conditions by correcting the APU speed based on the inlet air temperature to the APU compressor.

DETAILED DESCRIPTION OF THE EMBODIMENTS

Figure 1:
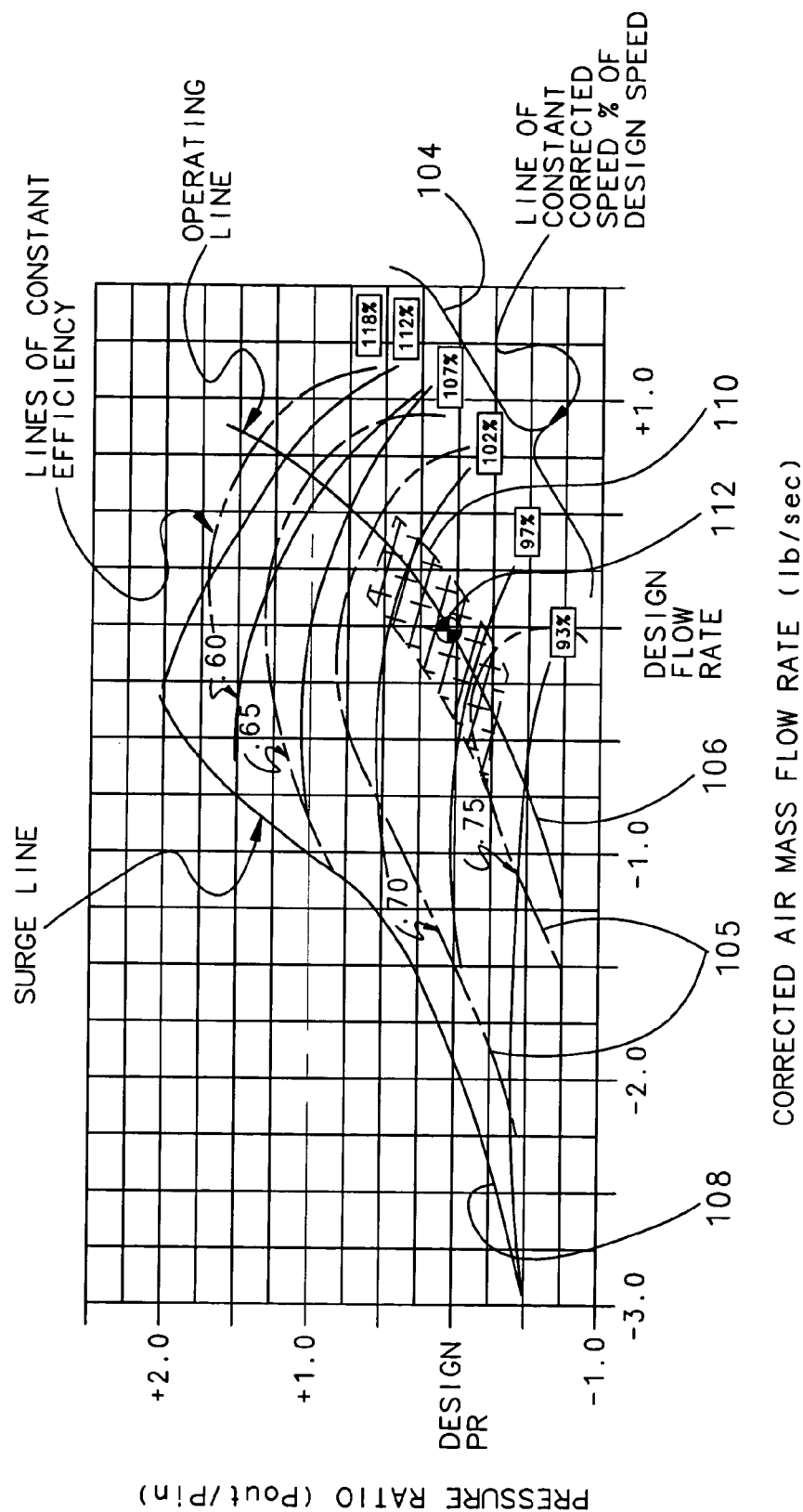
FIG. 1 is a compressor map illustrating relationships between a pressure ratio and an inlet flow along lines of constant corrected speed.

The present invention is generally directed to a method for varying an auxiliary power unit (APU) compressor performance based on the ambient temperature to optimize APU operation. Allowing the APU shaft speed to vary within a range, such as between 85% and 107% of nominal speed, the invention allows the APU to run faster when the ambient temperature is high and slower when the ambient temperature is low. This range may be overridden to meet selected speed and or phase matching criteria so that or power is transferred smoothly between the APU and other sources of aircraft electric power. Further, some speeds may be prohibited, to maintain a steady acceptable level of stress on the APU components, such as the blades and discs, to prevent undesirable vibratory stress amplification at a mechanical resonance condition. The process itself can be implemented in any known fashion, such as in a processor.

More particularly, the invention is directed to a method that runs the APU shaft near a constant corrected speed, which is expressed as a percentage of a design speed of the APU (i.e., 95% Nc represents a constant corrected speed that is 95% of the design corrected speed). The corrected speed % Nc reflects normalization of speed data to account for the ambient temperature of the air entering the compressor, allowing compressor performance to be expressed using normalized parameters. The corrected speed % Nc itself will be described in greater detail below with respect to FIG. 1.

The inventive method and system controls the APU to keep the APU running at a substantially constant corrected speed % Nc instead of a constant mechanical design speed. As can be seen in Equation 1 below, variations in the APU ambient inlet temperature requires variation in the shaft speed to keep the corrected speed % Nc constant, thereby optimizing the shaft speed for a given ambient inlet temperature. In one embodiment, the mechanical speed % Nm is allowed to vary between 85% Nm and 107% Nm to optimize the efficiency of the APU. Note that these ranges can be altered depending on the APU operating environment and the desired APU response to load and temperature changes.

In the example below, it is assumed that the minimum mechanical speed Nmech of the APU shaft is 85% of the design speed (indicated as 85% Nmech). This lower threshold may be driven by factors in the operating environment of the APU, such as the desire to match the power frequency and phase of the APU with a main engine while transferring a power load between the two. This minimum speed may also be selected as a function of the ambient air temperature or the minimum mechanical speed at which the electric power transfer between the APU and the main engine takes place.

Further, the example below assumes that the maximum mechanical speed is 107% of design speed (indicated as 107% Nmech). This maximum mechanical speed % Nmech is defined by, for example, the maximum APU speed that can still maintain a steady acceptable centrifugal stress in the blades and discs of the APU while avoiding vibrations due to resonance.

FIG. 1 illustrates a compressor map that can be used to determine an optimum APU shaft speed for a given ambient temperature. In this example, the compressor map illustrates compressor performance by plotting a relationship between a stage pressure ratio PR (i.e., compressor outlet pressure divided by compressor inlet pressure) and corrected mass flow along lines of a corrected speed % Nc 104. As noted above, the constant corrected speed % Nc is expressed as a percentage of design corrected speed. The corrected speed and corrected mass flow indicate that the values have been normalized to standard environmental conditions, where in this example:

Wdot=Air Mass Flow Rate (lb/sec)

THETA=Inlet Air Temperature (deg Rankine)/518.7 deg Rankine

DELTA=Inlet Air Pressure (psia)/14.7 psia

% Nc=% Nmech/(THETA)^0.5

$$W\text{dot,corrected}=W\text{dot}\times(\text{THETA})^{0.5}/\text{DELTA} \quad \text{Equation 1}$$

The corrected speed % Nc 104 normalizes the speed of inlet blading in the compressor by accounting for the speed of sound, which is a function of the inlet air temperature. As a result, on a standard day at 100% speed, the corrected speed % Nc and the mechanical speed % Nmech are equal to each other. If the air inlet temperature is different from the standard conditions (59F=518.7R), then the corrected speed % Nc will differ from the mechanical speed % Nmech. In this example, the compressor map of FIG. 1 shows a range of corrected speed % Nc between 93% and 118%.

The compressor map also includes lines corresponding to constant compressor efficiencies 105. Each efficiency line indicates the ratio of ideal power divided by the actual compressor power required at the given flow and delivery pressure. As shown in the compressor map, the best possible efficiency for the APU in this example is slightly over 75%. The way the turbine and the compressor in the APU match up when they are driven by the combustor in the APU is represented by an operating line 106.

As shown in FIG. 1, the APU operating parameters can be adjusted so that its corrected speed falls between 85% Nc and 106.7% Nc. The best area is 95% Nc to 105% Nc, shown in FIG. 1 as an optimum region 110 having an optimum point 112 corresponding to an APU operating condition that maximizes the pressure ratio, flow and efficiency. In the illustrated compressor map, the operating line 106 runs directly through the optimum point 112; thus, if the APU is operated at design pressure ratio and corrected flow at a corrected speed of 100% Nc, the APU will be operating near its maximum efficiency.

Because it is difficult to maintain the APU operating parameters at exactly the optimum point 112, depending on bleed air and shaft power required, the optimum region 110 allows some variation in the APU operation away from the optimum point 112, as can be seen in FIG. 1. Increasing the corrected speed % Nc increases the flow and the pressure ratio slightly, but reduces the compressor efficiency. Similarly, reducing the corrected speed % Nc improves the efficiency slightly, but reduces the flow and pressure ratio, limiting the APU power output. The optimum region 110 is selected to cover a range of deviation that would still be considered near optimal APU performance.

Note that there are cases where the constant mechanical speed APU will not be operated within the optimum region. For example, if the APU is required to generate a large amount of shaft power at a high altitude, where the air is cold and has a low density, the resultant temperature rise in the combustor of the APU under these conditions will reposition the operating line 106 toward the left. Further, higher altitudes (e.g., on the order of 25,000 feet above sea level and above) will change the relationship between the pressure ratio and the flow at higher corrected speeds % Nc as well as reduce compressor and turbine efficiency. The operating point must not become too close to the surge line 108. As is known in the art, compressor "surge" is an unstable and potentially destructive reversal of flow within the compressor. Thus, the optimum region 110 provides an operational target for the APU so that the APU speed can be adapted in the best possible way regardless of the actual operating conditions.

Figure 2:
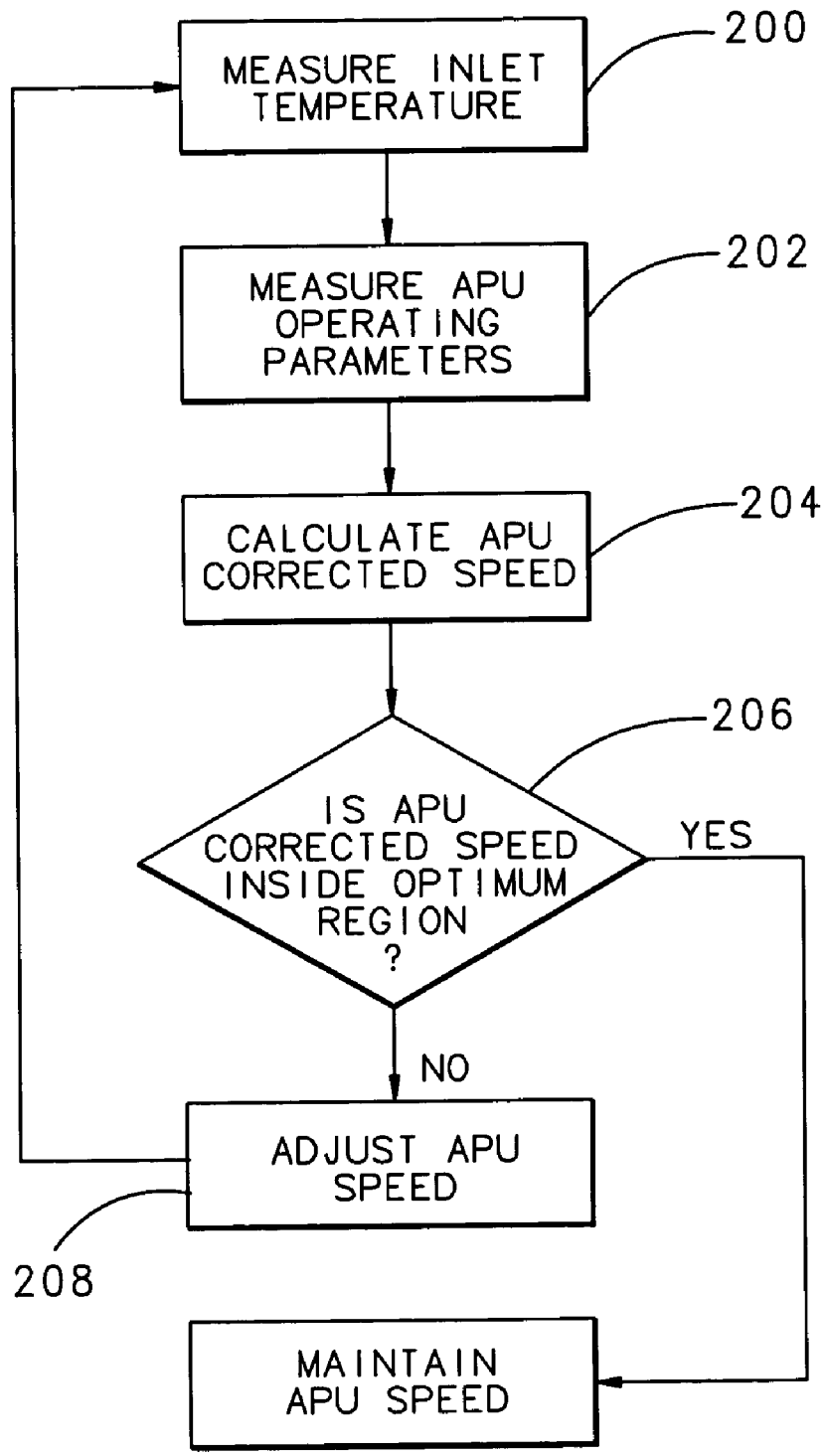
FIG. 2 is a flow diagram illustrating a method of controlling APU operating according to one embodiment of the invention.

FIG. 2 is a flow diagram summarizing the APU adjustment process according to one embodiment of the invention. The actual parameters can be measured and calculated using any known devices or systems. First, the inlet ambient temperature is measured (block 200) along with the current APU operating parameters, such as the APU speed, pressure ratio, and flow (block 202). The APU corrected speed is then calculated according to Equation 1 (block 204) and checked to determine whether it falls in the optimum region (block 206). If all of the measured parameters indicate that the APU is operating within the optimum region, including the constant corrected speed % Nc, then the APU continues to operate at its constant corrected speed % Nc.

If the current APU corrected speed is outside the optimum region, however, this indicates that the APU is not operating at its peak efficiency, pressure ratio, and flow for the given ambient temperature. The method therefore identifies the speed that should be adjusted to bring the APU operation back within optimum range (block 208) For example, if the APU is operating at a speed that causes the corrected speed % Nc to fall outside of the optimum region 110, the APU mechanical speed is increased or decreased to change the corrected speed.

Note that if the mechanical speed % Nmech needs to be lowered below the optimum region 110 to carry out a power transfer between the APU and the main engine, the constant corrected speed may be overridden by the mechanical speed. As noted above, the mechanical speed can be as low as 85% of the design speed (or 85% Nmech), which is lower than the 95% Nc minimum of the corrected speed in this embodiment. Once the power transfer is complete, the APU control method shown in FIG. 2 may be resumed to keep the corrected speed % Nc within the optimum region 110. The APU no-load (idle) speed may be set at or about 85% Nc also.

Figure 3:
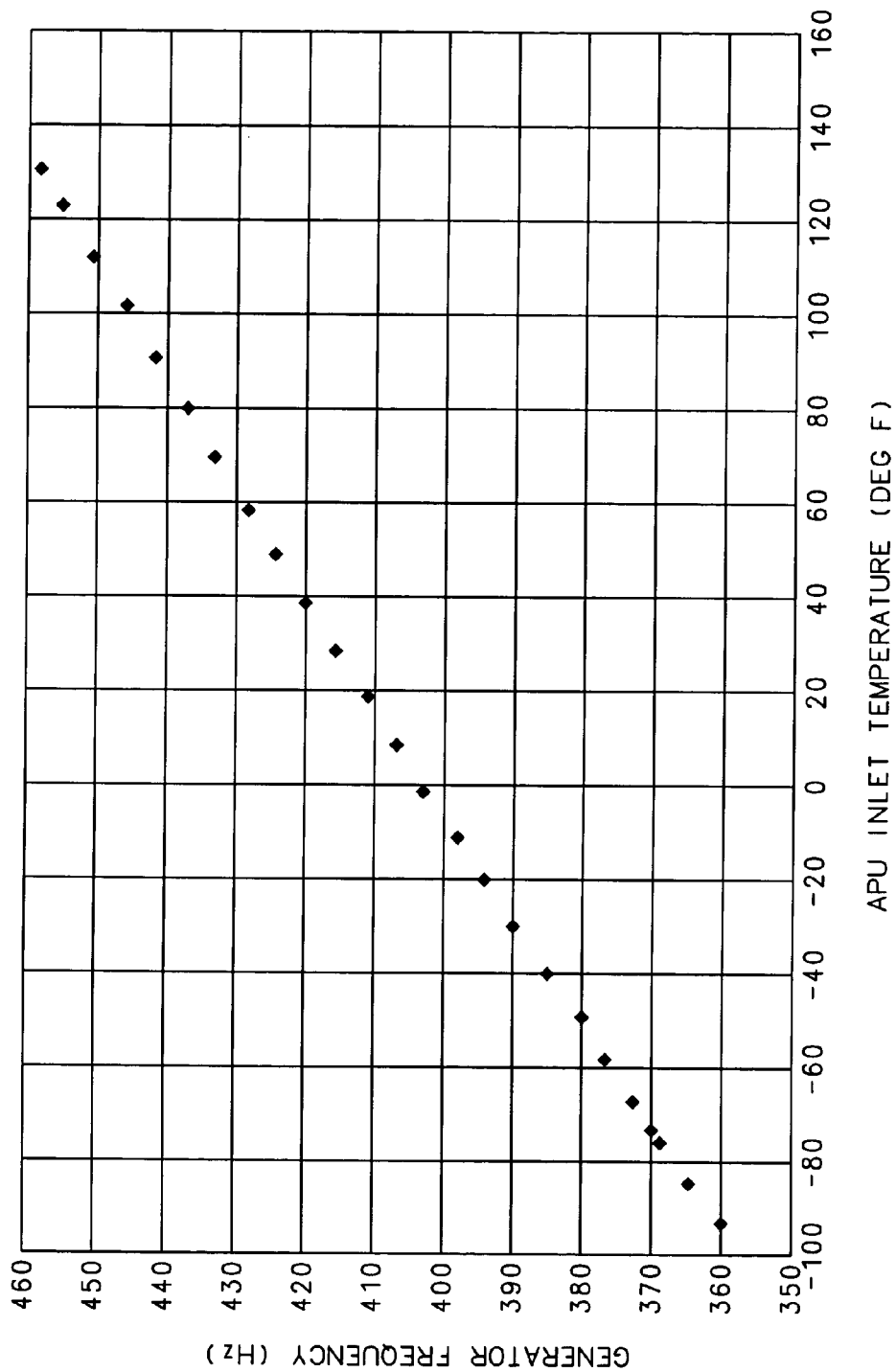
FIG. 3 is a graph illustrating a relationship between APU generator frequency and APU inlet temperature.
Figure 4:
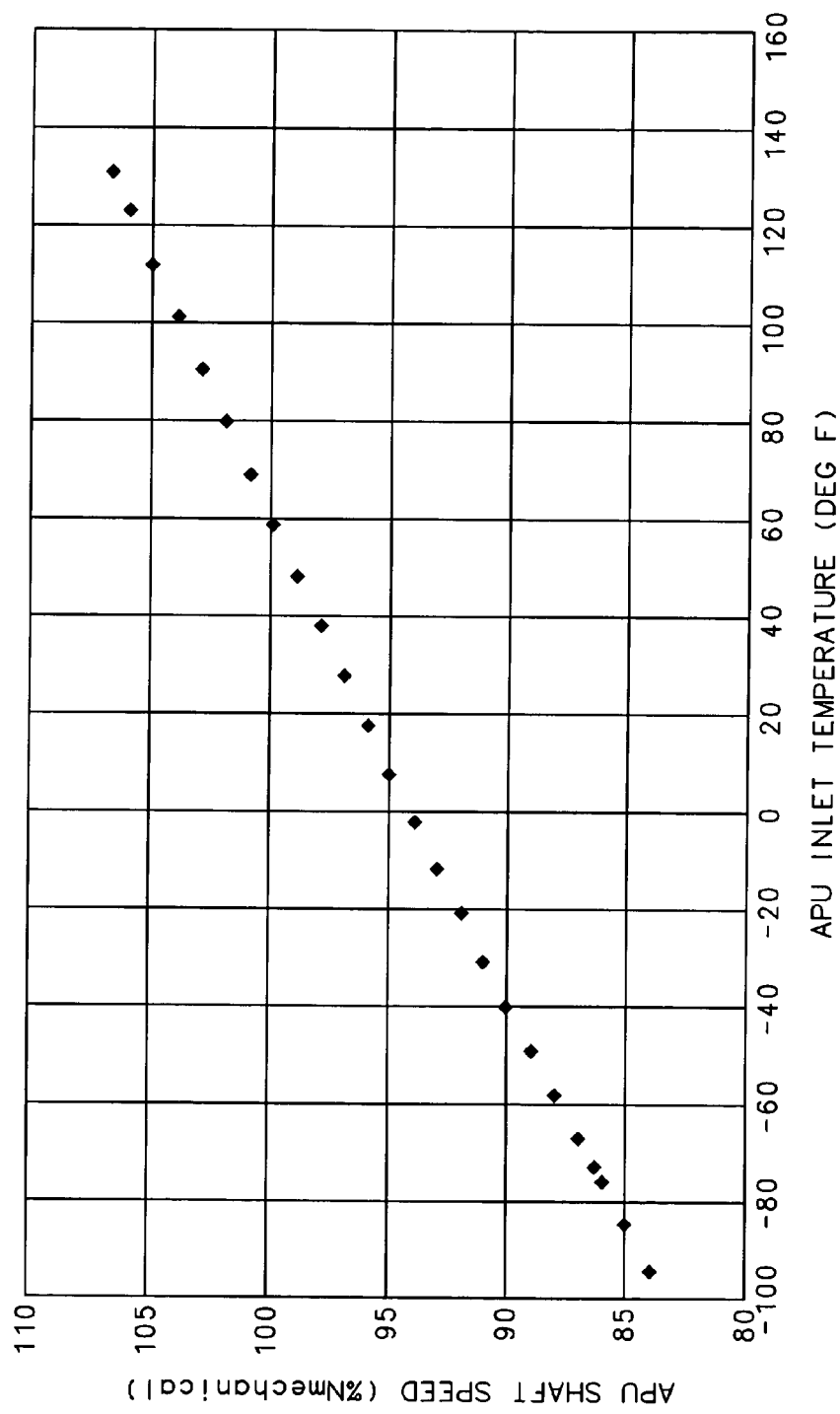
FIG. 4 is a graph illustrating a relationship between APU speed and APU inlet temperature.

FIG. 3 illustrates one example of a relationship between the APU generator frequency and the inlet temperature, and FIG. 4 illustrates one example of a relationship between the APU speed and the inlet temperature. As can be seen in these figures, these relationships are linear with the square root of absolute inlet temperature into the compressor, making it easy to predict and control APU speed and frequency as a function of the ambient temperature. FIGS. 3 and 4 are used as starting points to generate the compressor map of FIG. 1 and the values for the optimum region 110. As noted above, the generator frequency is driven by the APU shaft speed and the APU shaft speed is driven by temperature. The figures show the APU operation if left to operate on its own, without any outside control, as the temperature changes. These operating characteristics are the motivation for running the APU at the constant corrected speed Nc in the compressor portion of the APU.

In this example, the nominal generator frequency for most aircraft systems is 400 Hz. As shown in the Figures, the APU operates at a variable speed that changes with temperature so that the APU runs faster on hot days and slower on cold days. More particularly in this example, the APU operates near a linearly increasing frequency and shaft speed until the temperature reaches around 131 degrees Fahrenheit; at that point, the frequency and shaft speed stay flat for higher temperatures. In this example, the anticipated maximum temperature is 131 degrees Fahrenheit, the anticipated minimum temperature is around −97 degrees Fahrenheit, and the corresponding generator frequency range between 458 Hz and 360 Hz (FIG. 3).

Thus, by varying the APU shaft speed based on the ambient temperature so that it runs at a generally constant corrected speed Nc, the invention can optimize APU operation based on the ambient inlet temperature. Running the APU at a constant temperature-based corrected speed rather than a fixed mechanical speed ensures that the APU can run at maximum efficiency, maximum flow, and best pressure ratio even if the ambient temperature changes. Further, providing an optimum operating region provides a target operating range for the APU so that it can adjust its speed, pressure ratio and/or flow a known amount if the APU drifts outside the optimum region 110.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A method for controlling a gas turbine auxiliary power unit (APU), comprising:
    detecting an inlet temperature; and
    varying an APU shaft speed in response to the inlet temperature to maintain a corrected speed between a minimum mechanical speed and a maximum mechanical speed.

2. The method of claim 1, wherein the varying step comprises:
    increasing the APU shaft speed when the detected inlet temperature increases; and
    decreasing the APU shaft speed when the detected inlet temperature decreases.

3. The method of claim 2, wherein the varying step further comprises:
    calculating the corrected speed from the APU shaft speed and the inlet temperature; and
    maintaining the corrected speed within a selected optimum region with the increasing and decreasing steps.

4. The method of claim 3, wherein the optimum region corresponds to a substantially constant corrected speed.

5. The method of claim 4, wherein the substantially constant corrected speed is between 95% and 105% of a design speed.

6. The method of claim 3, further comprising:
    overriding the maintaining step during a power transfer operation between the APU and a main engine.

7. A method for controlling an auxiliary power unit (APU), comprising:
    detecting an inlet air temperature;
    calculating a corrected speed from an APU shaft speed and the inlet temperature; and
    maintaining the corrected speed within a selected optimum region by varying the APU shaft speed based on the inlet air temperature, wherein the APU shaft speed is increased when the detected inlet air temperature increases and wherein the APU shaft speed is decreased when the detected inlet air temperature decreases.

8. The method of claim 7, wherein the step of calculating the corrected speed comprises dividing the APU shaft speed by a normalized inlet temperature value calculated from the inlet temperature.

9. The method of claim 7, wherein the corrected speed in the optimum region is between approximately 95% and 105% of a design speed.

10. The method of claim 7, further comprising
    overriding the maintaining step during a power transfer operation between the APU and a main engine.

11. The method of claim 7, wherein the maintaining step further comprises adjusting a flow through the APU.

12. The method of claim 1, further comprising the steps of:
    defining the minimum mechanical speed as 85% Nmech; and
    defining the maximum mechanical speed at 107% Nmech wherein % Nc=% Nmech/THETA^0.5.

13. The method of claim 1, wherein the varying step is in response to a compressor map.

* * * * *

UNITED STATES PATENT AND TRADEMARK OFFICE
CERTIFICATE OF CORRECTION

PATENT NO. : 7,367,193 B1
APPLICATION NO. : 10/625288
DATED : May 6, 2008
INVENTOR(S) : Thompson It is certified that error appears in the above-identified patent and that said Letters Patent is hereby corrected as shown below:

Claim 12, Column 6, line 52: "85% Nmech" should read as --85%Nmech--

Claim 12, Column 6, line 54: "107% Nmech" should read as --107%Nmech--

Claim 12, Column 6, lines 54-55: "% Nc=% Nmech/THETA)^0.5." should read as --%Nc = %Nmech/(THETA)^0.5.--

Signed and Sealed this

Twenty-ninth Day of July, 2008

JON W. DUDAS
*Director of the United States Patent and Trademark Office*